(12) United States Patent
Yuan et al.

(10) Patent No.: US 11,023,460 B2
(45) Date of Patent: Jun. 1, 2021

(54) TRANSPARENT USER-DEFINED FUNCTION (UDF) OPTIMIZATION

(71) Applicants: Heng Yuan, Temecula, CA (US); Judy Wu, San Diego, CA (US); Yu Long, San Diego, CA (US); Congnan Luo, San Diego, CA (US)

(72) Inventors: Heng Yuan, Temecula, CA (US); Judy Wu, San Diego, CA (US); Yu Long, San Diego, CA (US); Congnan Luo, San Diego, CA (US)

(73) Assignee: Teradata US, Inc., San Diego, CA (US)

(*) Notice: Subject to any disclaimer, the term of this patent is extended or adjusted under 35 U.S.C. 154(b) by 783 days.

(21) Appl. No.: 15/852,559

(22) Filed: Dec. 22, 2017

(65) Prior Publication Data

US 2019/0197156 A1    Jun. 27, 2019

(51) Int. Cl.
  *G06F 16/30*    (2019.01)
  *G06F 16/242*   (2019.01)
  *G06F 8/41*     (2018.01)
  *G06F 8/30*     (2018.01)
  *G06F 16/22*    (2019.01)
  *G06F 8/51*     (2018.01)

(52) U.S. Cl.
  CPC .......... *G06F 16/2448* (2019.01); *G06F 8/30* (2013.01); *G06F 8/427* (2013.01); *G06F 8/51* (2013.01); *G06F 16/2291* (2019.01); *G06F 16/244* (2019.01)

(58) Field of Classification Search
  CPC .......... G06F 16/2291; G06F 8/30; G06F 8/427
  See application file for complete search history.

(56) References Cited

U.S. PATENT DOCUMENTS

| | | | |
|---|---|---|---|
| 8,112,408 B2 | 2/2012 | Chen et al. | |
| 8,977,266 B2 | 3/2015 | Takahashi et al. | |
| 2004/0049736 A1* | 3/2004 | Al-Azzawe | G06F 8/00 715/239 |
| 2012/0130963 A1* | 5/2012 | Luo | G06F 16/2443 707/693 |
| 2013/0110862 A1* | 5/2013 | Chen | G06F 16/2455 707/766 |
| 2013/0254238 A1 | 9/2013 | Yan et al. | |
| 2015/0220597 A1 | 8/2015 | Simhadri et al. | |
| 2017/0091446 A1* | 3/2017 | Bendel | G06F 21/629 |
| 2017/0161266 A1* | 6/2017 | Chen | G06F 16/24 |
| 2018/0329952 A1* | 11/2018 | Ramachandra | G06F 16/90335 |

OTHER PUBLICATIONS

Article entitled "Rewriting Procedures for Batched Bindings", by Guravannavar et al., dated Aug. 28, 2008.*

* cited by examiner

*Primary Examiner* — Mahesh H Dwivedi
(74) *Attorney, Agent, or Firm* — Gates & Cooper LLP

(57) ABSTRACT

A User-Defined Function (UDF) provided by a user and accessed through a user query is identified. A wrapper for the UDF is generated. The wrapper represents a customized instance of the UDF. The wrapper, during execution, selectively calls the UDF provided by the user. Any query that references the UDF is rewritten to process the wrapper instead of the UDF.

15 Claims, 9 Drawing Sheets

```
#define SQL_TEXT Latin_Text
#include <sqltypes_td.h>
#include <string.h>
#include <math.h>
typedef struct agr_storage {
        FLOAT count;
        FLOAT x_sq;
        FLOAT x_sum;
} AGR_Storage;

void STD_DEV(   FNC_Phase phase,
                FNC_Context_t *fctx,
                FLOAT *x,
                FLOAT *result,
                int *x_i,
                int *result_i,
                char sqlstate[6],
                SQL_TEXT fncname[129],
                SQL_TEXT sfncname[129],
                SQL_TEXT error_message[257] )
{
        /* pointers to intermediate storage areas */
        AGR_Storage *s1 = fctx->interim1;
        AGR_Storage *s2 = fctx->interim2;

/* The standard deviation function described here is: */
        /* s = sqrt(sum(x^2)/N - (sum(x)/N)^2) */ switch (phase)
        {
                /* This case selection is called once per group and allocates and initializes
                /* all intermediate aggregate storage */ case AGR_INIT:
                        /* Get some storage for intermediate aggregate values. */
                        s1 = FNC_DefMem(sizeof(AGR_Storage));
                        if (s1 == NULL)
                        {
                                strcpy(sqlstate, "U0001"); /* could not get storage, see SQLSTATE table */
                                return;
}
}
/* Initialize the intermediate aggregate values */
s1->count = 0;
s1->x_sq = 0;
s1->x_sum = 0;

/* Fall through to detail phase, because the AGR_INIT call passes
/* in the first set of values for the group */
```

FIG. 1B

```
/* This case selection is called once for each selected row to aggregate. x is the column the */
/* std_dev is being calculated for. One copy will be running on each AMP */
case AGR_DETAIL:
if (*x_i != -1)
{
s1->count++;
s1->x_sq += *x * *x;
s1->x_sum += *x;
}
break;

/* This case selection combines the results of individual AMPs for each group */ case AGR_COMBINE:

s1->count += s2->count;

s1->x_sq += s2->x_sq;

s1->x_sum += s2->x_sum;

break;

/* This case selection returns the final standard deviation. It is called once for each group. */ case AGR_FINAL:

{

FLOAT term2 = s1->x_sum/s1->count;

FLOAT variance = s1->x_sq/s1->count - term2*term2;

/* Adjust for deviations close to zero */ if (fabs(variance) < 1.0e-14)

variance = 0.0;

*result = sqrt(variance);

break;

} case AGR_NODATA:

/* return null if no data */

*result_i = -1;

break;
```

```
default:
/* If it gets here there must be an error because this */
/* function does not accept any other phase options */
strcpy(sqlstate, "U0005");
}
return;
}
```

```
#define SQL_TEXT Latin_Text
#include <sqltypes_td.h>
#define COLSIZE(n) ( sizeof(FNC_TblOpColumnDef_t) + (sizeof(parm_tx) * (n-1)) )

int STD_DEV_contract(
   INTEGER *Result,                                          ◄──── 120
   int *indicator_Result,
   char sqlstate[6],
   SQL_TEXT extname[129],
   SQL_TEXT specific_name[129],
   SQL_TEXT error_message[257])
{
      FNC_TblOpColumnDef_t *oCols;
int colcount = 2;

oCols = (FNC_TblOpColumnDef_t *)FNC_malloc( TblOpSIZECOLDEF(colcount) );
memset(oCols, 0 , TblOpSIZECOLDEF(colcount) );
TblOpINITCOLDEF(oCols, colcount);

/* The below bolded block is auto-generated based on the */
/* Group BY column used by aggregate UDF */
oCols->column_types[0].datatype = INTEGER_DT;                    ⎫
oCols->column_types[0].size.length = 4;                          ⎬── 121
strcpy(oCols->column_types[0].column, 'ProductID');              ⎭

/* The below bolded block is auto-generated based on the */
      /* return parameter defined in the DDL of the aggregate UDF */
oCols->column_types[1].datatype = REAL_DT;                       ⎫
oCols->column_types[1].size.length = 8;                          ⎬── 122
strcpy(oCols->column_types[1].column, 'STD_DEV');                ⎭

FNC_TblOpSetOutputColDef(0, oCols);
      FNC_free(oCols);
*Result = 1;

return 2;
} void STD_DEV_tblop()
{
  FNC_TblOpHandle_t    *inHandle, *OutHandle;

FNC_Context_t fctx;
  double *input1;
  double result;
  int x_i=1, result_i=1;
  SQL_TEXT fncname[129]={0},sqlstat[129] ={0}, error_message[257]={0};

strcpy(fncname, "STD_DEV");
  strcpy(sqlstate, "00000");
```

FIG. 1E

```
FNC_TblOpGetColDef(0, ISINPUT, iCols);
inHandle = (FNC_TblOpHandle_t *)FNC_TblOpOpen(0, 'r', 0);
OutHandle = (FNC_TblOpHandle_t*)FNC_TblOpOpen(0,'w',0);

/* invoke the original c code of aggregate UDF with phase "AGR_INIT" */
STD_DEV(AGR_INIT, &fctx, input2, result, &x_i, &result_i, fncname, sqlstate, error_message);   }— 123 while (FNC_TblOpRead(inHandle) == TBLOP_SUCCESS)
{
   input1 = inHandle->row->columnptr[0];
   input2 = inHandle->row->columnptr[1];

124 —{ /* for each input row, invoke the original c code of aggregate UDF with phase "AGR_DETAIL" */
      STD_DEV(AGR_DETAIL, &fctx, input2, result, &x_i, &result_i, fncname, sqlstate, error_message);
}

125 —{ /* invoke the original c code of aggregate UDF with phase "AGR_FINAL" */
      STD_DEV(AGR_FINAL, &fctx, input2, result, &x_i, &result_i, fncname, sqlstate, error_message);

memcpy(OutHandle->row->columnptr[0], input1, sizeof(input1));
memcpy(OutHandle->row->columnptr[1], result, sizeof(result));
FNC_TblOpWrite(OutHandle);  // Writes current output row FNC_free(fctx.interim1);
FNC_TblOpClose(inHandle);   // close all contexts
FNC_TblOpClose(OutHandle);  // close all contexts
}
```

TRANSPARENT USER-DEFINED FUNCTION (UDF) OPTIMIZATION

BACKGROUND

User-Defined Functions (UDF) are useful programming mechanisms to perform custom functions utilizing an existing relational database's Application Programming Interfaces (APIs).

One particular UDF is an aggregate UDF that permits aggregation of data from tables in a customized manner. For instance, users can write row-based logic and return a single aggregated value for every group of rows in the database for a variety of purposes, such as finding the average age of employees in each department of a company. In this example, an average function is processed on an age column of a table and grouped based on a department identifier column. Aggregate UDFs can be used for a variety of useful purposes by the users.

Some aggregate UDFs are provided as part of the underlying functions accessible through the database API, some are customized by the users, and some are a combination of both. Typically, a UDF can either execute in a non-protected mode or a protected mode. In a non-protected mode, the UDF is called within the database kernel for database engine of process thread. This makes the UDF execute very quickly. But since the user's UDF code is running in the database kernel, this is an increased risk of crashing the entire database should the UDF code have errors. In a protected mode, the UDF is executed in a separate process thread from that of the database kernel. The database engine initiates the UDF remotely and the UDF parameters and results are passed back and forth between the database kernel threads and the separate process thread. This guarantees the best protection in ensuring the database kernel does not crash because any errors in the UDF are isolated to the separate process thread. But performance (responsiveness) is degraded because of the high cost of passing data between the kernel and the separate process thread.

Often database vendors provide aggregate UDFs for use but the users find the interfaces to difficult to deploy with their immediate needs; as a result, users more often elect to develop their own customized aggregate UDFs. However, a database vendor's aggregate UDF has likely been tested and certified and is less likely to have any errors, and is capable of safely running from the database kernel.

SUMMARY

Transparent UDF optimization processing methods and a system are presented.

In an embodiment, a method for transparent UDF optimization processing is provided. A source code for a UDF being created by a user is identified in a DDL statement. An equivalent source code is generated for the UDF. A wrapper source code representing an instance of the equivalent source code is created, the wrapper source code selectively calls the UDF. An executable version of the instance is processed when the UDF is called in a query.

BRIEF DESCRIPTION OF THE DRAWINGS

FIGS. 1B-1D illustrate a sample source code for an aggregate UDF, according to an example embodiment.

FIGS. 1E-1F illustrate a sample wrapper source code that calls the aggregate UDF of the FIGS. 1B-1D and represents transparent UDF optimization processing, according to an example embodiment.

DETAILED DESCRIPTION

Various embodiments depicted herein are implemented as one or more software modules, which are programmed within memory and/or non-transitory computer-readable storage media and executed on one or more processing devices (having memory, storage, network connections, one or more processors, etc.).

As used herein, the terms and phrases "database," and "data warehouse" may be used interchangeably and synonymously. That is, a data warehouse may be viewed as a collection of databases or a collection of data from diverse and different data sources that provides a centralized access and federated view of the data from the different data sources through the data warehouse (may be referred to as just "warehouse").

As used here, the term "transparent" is intended to mean that an end-user that develops a customized aggregate UDF is completely unaware of and needs to take no action for the original aggregated UDF to be transformed into a more secure and processor/memory efficient aggregated UDF for execution by one or more Access Module Processors (AMPs) (database engine) of a database.

As presented herein and below, a more processor/memory efficient executable code is provided by transparently generating a wrapper around a user-provided UDF, with the wrapper executed each time the user-provided UDF is called from a user application.

Figure 1A:
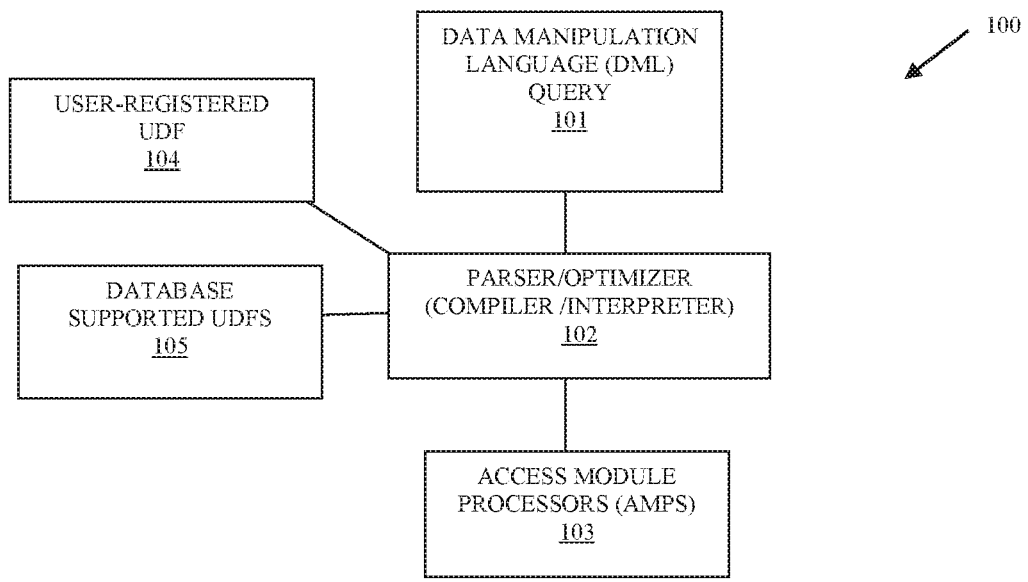
FIG. 1A is a diagram of a system for transparent UDF optimization processing, according to an embodiment.

FIG. 1A is a diagram of a system 100 for transparent UDF optimization processing, according to an embodiment.

The system 100 is shown in greatly simplified form with just those components necessary for comprehension of embodiments of the invention presented. It is to be understood that additional components or subcomponents may be used without departing from the teachings presented herein.

The system 100 includes a Data Manipulation Language (DML) (such as Structured Query Language (SQL)) query 101 (herein after just "query 101," a parser/optimizer (compiler/interpreter) 102 (herein after just "parser 102"), AMPs—that execute instructions against the database, at least one user-registered UDF 104, and one or more database supported UDFs 105.

The query 101 can be issued and/or originate from an automated process (application or script) within the warehouse (such as through schedule reports, etc.) or can be issued and/or originate from an end-user (such as a Database Administrator (DBA) or Data Analyst) through a user-interface to the warehouse.

The parser 102 translates or interrupts the query 101 DML syntax and structure into a set of optimal executable instructions that the AMPs processes against the warehouse.

The AMPS 103 are essentially the warehouse engine (database engine) that process the instructions provided by the parser 102 on one or more physical nodes (computing devices with processors, memory, storage) of a network for the warehouse.

When a user develops a customized UDF 104, an API of the database permits the user to register that UDF with the database for use in queries 101.

The transparent UDF optimization processing will now be discussed within the context of an example. A source code 110 for the UDF 104 is shown in the FIGS. 1B-1D. The user registers or creates the UDF 104 with the following Data Definition Language (DDL) set of statements:

```
CREATE FUNCTION STD-DEV(x FLOAT)
RETURNS FLOAT
CLASS AGGREGATE
LANGUAGE C
NO SQL
PARAMETER STYLE SQL
EXTERNAL;
```

The source code 110 for the UDF 104 is an example program for generating a standard deviation. The DML presented is Structured Query Language (SQL). The programming language of the source code 110 is C. The DDL statements effectively registers the UDF 104 for use by the user in a query 101.

When the user wants to process the UDF 104, the user produces a query 101 that calls the UDF 104. A sample of such a query 101 appears as follows for the running example:

```
SELECT Product_ID, STD_DEV(Hours)
FROM Product_Life
WHERE Product_Class = 'Bulbs'
GROUP BY Product_ID;
```

When the parser 102 detects the CREATE FUNCTION in the initial DDL provided by the user for the UDF 104, the source code 110 is analyzed and an equivalent supported UDF 105 is created with the wrapper code 120 (shown in the FIGS. 1D-1F).

Specifically, the block of code 121 is generated based on the GROUP BY clause Product_ID (groupings to aggregate for in the UDF 104). Code block 122 is generated based on the RETURN parameter in the DDL (the results of the UDF 104). Code block 123 is generated to initiate the aggregate UDF 104 defined in the UDF as phase "AGR_INIT. Code block 124 is generated to invoke the aggregate UDF 104 within a loop to perform the main process of phase AGR_DETAIL of the UDF 104. Code block 125 is generated after the loop associated with block 124 and to finalize the results with phase AGR_FINAL of the UDF 104.

The wrapper code 120 is generated as a customized instance for a supported UDF 105 that represents an equivalent of the UDF 104. The name of the wrapper code 120 is the same name as the user's original created UDF 104. The original source code 110 is enhanced within the wrapper code 120 to handle input data (data provided as input and produced as output for the standard deviation UDF 104) in memory from a server and to allow access to that memory. The allocated memory is freed at the end of the wrapper code 120.

The input data is batched and passed to the user's original UDF 104 from the memory in block 124. The equivalent UDF 105 and its manner in which input data is buffered in memory and the processing flow of the equivalent UDF 105 is maintained and customized to the user's UDF 104 with the user's actual source code 110 and called from the wrapper code 120. This ensures the wrapper code 120 is memory and processor efficient based on stability of the equivalent UDF 105.

The parser 102 also automatically rewrites the user's original DDL (presented above) to call the wrapper code. For example, the parser 102 rewrites the original DDL as follows:

```
REPLACE FUNCTION STD_DEV_tblop ( )
RETURNS TABLE VARYING USING FUNCTION
STD_DEV_contract
    SPECIFIC STD_DEV_tblop
    LANGUAGE C
    NO EXTERNAL DATA
    PARAMETER STYLE SQLtable
    NOT DETERMINISTIC
    CALLED ON NULL INPUT
    EXTERNAL 'CS:STD_DEV_tblop ! STD_DEV_tblop.c ! F !
STD_DEV_tblop';
```

This rewritten DDL provides a mechanism by which when the original UDF 104 is called, the wrapper code 120 is called as STD_DEV_tblop, which is also now an equivalent of a supported aggregate UDF 105. This also registers the users UDF 104 and associates it with the wrapper code 120. After this point in time, any query 101 (such as the sample user query presented above for this example) that calls the original UDF 104 is identified by the parser 102 and the query 101 is transparently rewritten as follows:

```
SELECT Product_ID, STD_DEV
FROM STD_DEV_tblop (
ON (SELECT Product_ID, Hours
FROM Product_Life
WHERE Product_Class = 'Bulbs")
PARTITION BY Product_ID) d1;
```

The PARTITION BY in the rewritten SELECT statement corresponds to the GROUP BY clause in the user's original SELECT statement. This groups together all rows of a particular group from all AMPs 103 into one partition, and then, the equivalent wrapper code 120 is called once for each partition, i.e., each group, so that the aggregate standard deviation results are achieved.

This is all processed transparently to the user. The parser 102 performs all of the rewritten code above. The user's original source code 110, DDL, and query 101 remains unchanged and all is rewritten by the parser 102 in the manner discussed above with the presented example. This permits the original user's aggregate UDF 104 to process as an instance of an equivalent aggregate UDF 105 through execution of the wrapper code 120, which is automatically and dynamically generated with the rewritten DDL and query 101.

The user still develops whatever aggregate UDF 104 that the user wants or desires, all database interfaces and APIs remain unchanged, the user still provides the DDL, and the user still provides a desired query 101 that corresponds to the user-developed UDF 104 and DDL. All processing is transparent to the users.

The system 100 provides considerable processing and memory improvements for a protected mode UDF by switching from row-based logic to batch-mode logic with preservation and protection from crashing the database due to a user error in the user UDF 104 while maintaining the interface of a supported UDF 105. The system 100 also provides a transparent conversion from an aggregate UDF 104 to an instance of a high-performance aggregate UDF 105, such that existing legacy UDFs do not have to be rewritten to achieve the benefits of the system 100 (because the parser 102 dynamically and in real time performs the translation and conversion). The system 100 also removes the fear that users may have in developing custom aggregate UDFs using existing supported UDFs 105 because of the perceived complexity in the existing interfaces of the existing supported UDFs 105.

In an embodiment, the supported UDF 105 is a supported Table Operator function.

These and other embodiments are now discussed with reference to the FIGS. 2-4.

Figure 2:
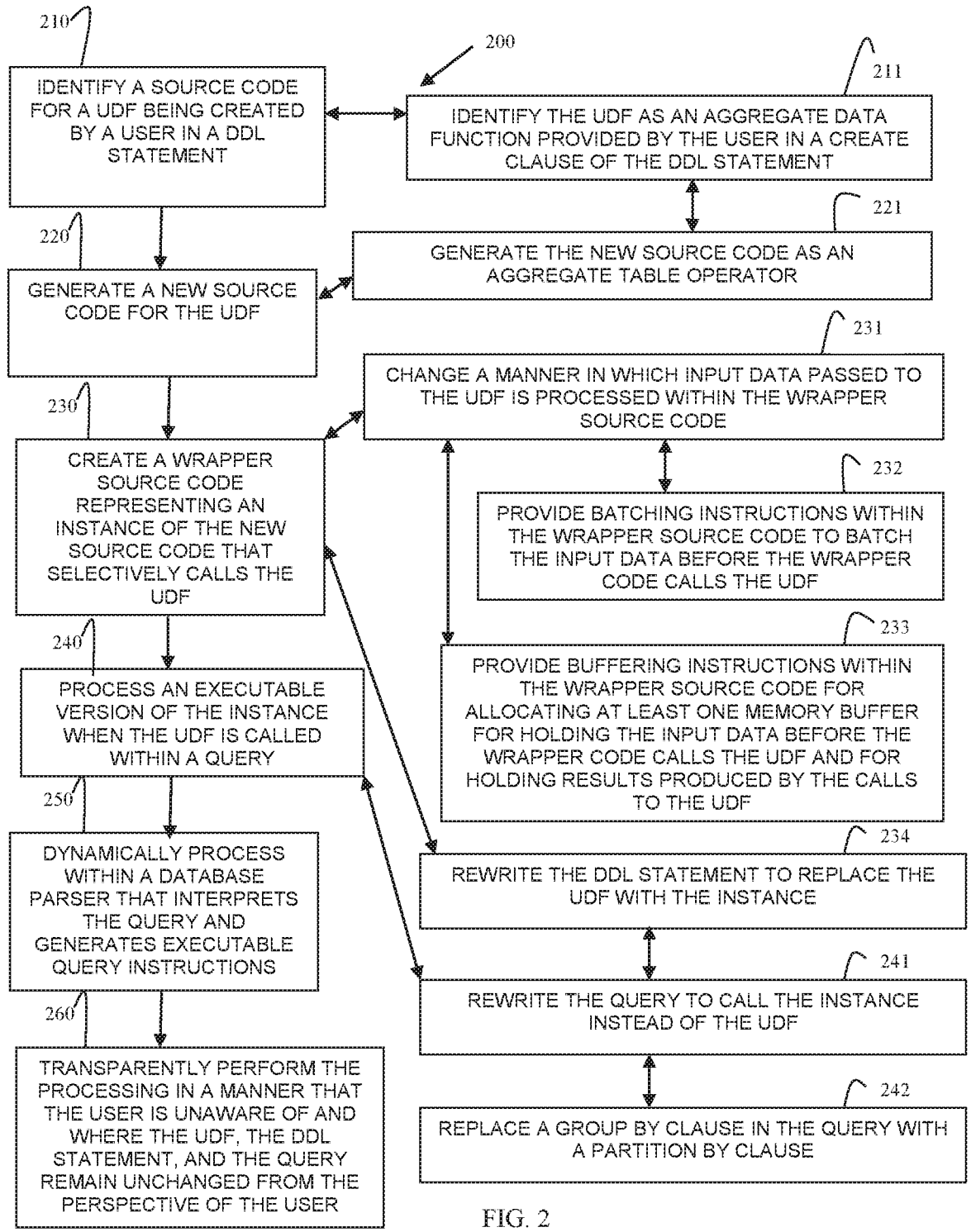
FIG. 2 is a diagram of a method for transparent UDF optimization processing, according to an example embodiment.

FIG. 2 is a diagram of a method 200 for transparent UDF optimization processing, according to an example embodiment. The method 200 is implemented as one or more software modules referred to as "UDF wrapper generator"). The UDF wrapper generator is executable instructions that are programmed within memory or a non-transitory computer-readable medium and executed by one or more hardware processors. The UDF wrapper generator has access to one or more network connections during processing, which can be wired, wireless, or a combination of wired and wireless.

In an embodiment, the UDF wrapper generator is implemented within a data warehouse across one or more physical devices or nodes (computing devices) for execution over a network connection.

In an embodiment, the UDF wrapper generator is all or some combination of the processing discussed for the parser 102.

At 210, the UDF wrapper generator identifies a source code for a UDF that is being created by a user in a DDL statement within an API of the database.

According to an embodiment, at 211, the UDF wrapper generator identifies the UDF as an aggregate data function provided by the user in a create clause of the DDL statement.

At 220, the UDF wrapper generator generates a new source code for the UDF.

In an embodiment of 211 and 220, at 221, the UDF wrapper generator generates the new source code as an aggregate table operator supported by the database.

At 230, the UDF wrapper generator creates a wrapper source code representing an instance of the new source code that selectively calls the UDF. That, is the manner in which memory and storage are configured and how the input data is passed and the output is processed from the UDF is altered with the wrapper source code. The UDF remains as originally provided by the User but when the UDF is called it is controlled by the instructions of the wrapper source code, and the wrapper source code is an instance of an operation provided by the database modified to selectively call the UDF. A detailed example of this was provided above with the FIGS. 1B-1F.

In an embodiment, at 231, the UDF wrapper generator changes a manner in which input data passed to the UDF is processed within the wrapper source code.

In an embodiment of 231 and at 232, the UDF wrapper generator provides batching instructions within the wrapper source code to batch the input data before the wrapper calls the UDF. This was discussed above with the wrapper code 120 and specifically in block 124.

In an embodiment of 231 and at 233, the UDF wrapper generator provides buffering instructions within the wrapper source code for allocation at least one memory buffer for holding the input data before the wrapper code calls the UDF and for holding results produced by the calls to the UDF.

In an embodiment, at 234, the UDF wrapper generator rewrites the DDL statement to replace the UDF with the instance and register the instance with the database.

At 240, the UDF wrapper generator process an executable version of the instance when the UDF is called within a query. That is, the UDF wrapper generator passes the query instructions including a reference to the executable instructions for the instance (the wrapper source code in executable form) to the database engine (such as AMPs 103).

In an embodiment of 234 and 240, at 241, the UDF wrapper generator rewrites the query to call the instance instead of the UDF.

In an embodiment of 241 and at 242, the UDF wrapper generator replaces a GROUP BY clause in the query with a PARTITION BY clause. This was discussed above with the FIGS. 1A-1F.

According to an embodiment, at 250, the UDF wrapper generator dynamically processes 210-242 within a database parser/optimizer that interprets the query and generates executable query instructions that a database engine can processing to satisfy the query.

In an embodiment of 250 and at 260, the UDF wrapper generator transparently performs the processing 210-250 in a manner that the user is unaware of and where the user-provided: UDF, DDL statement, and query remain unchanged from the perspective of the user. That is all of the processing presented is background and invisible to the user and handled by the parser/optimizer enhanced with the UDF wrapper generator.

Figure 3:
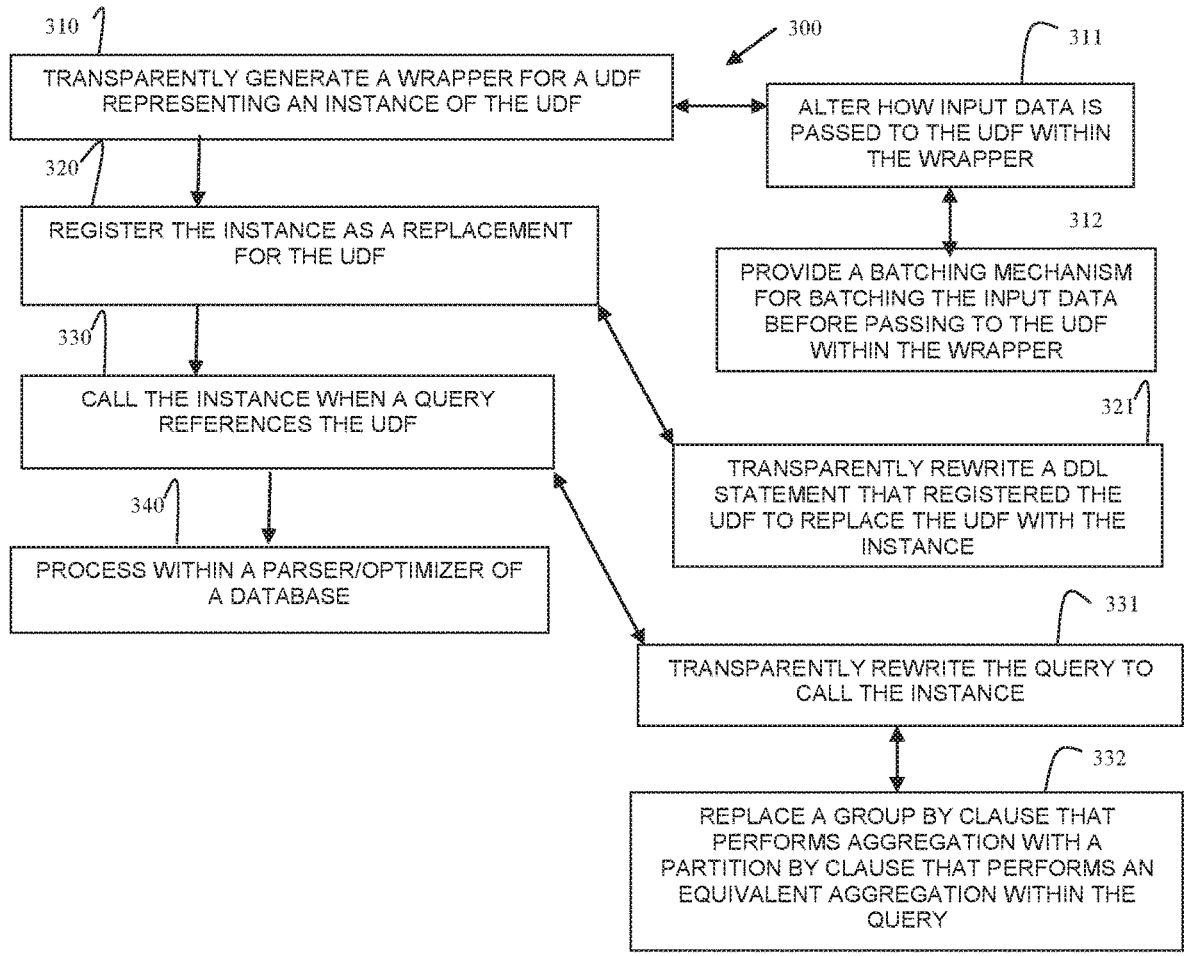
FIG. 3 is a diagram of a method for transparent UDF optimization processing, according to an example embodiment.

FIG. 3 is a diagram of a method 300 for transparent UDF optimization processing, according to an example embodiment. The method 300 is implemented as one or more software modules referred to as a "query parser". The query parser is executable instructions that are programmed within memory or a non-transitory computer-readable medium and executed by one or more hardware processors. The query parser has access to one or more network connections during processing, which can be wired, wireless, or a combination of wired and wireless.

The query parser presents another and in some ways enhanced perspective of the processing discussed above with the FIGS. 1A-1F and 2.

In an embodiment, the query parser is all or some combination of: the parser 102 and/or the method 200.

At 310, the query parser transparently generates a wrapper for a user-provided UDF. The wrapper representing a customized instance of the UDF that is supported by the database.

In an embodiment, at 311, the query parser alters how input data is passed to the UDF within the wrapper.

In an embodiment of 311 and at 312, the query parser provides a batching mechanism for batching input data before passing to the UDF within the wrapper.

At 320, the query parser registers the instance as a replacement for the UDF.

According to an embodiment, at 321, the query parser transparently rewrites a DDL statement that registered the UDF to replace the UDF with the instance.

At 330, the query parser calls the instance when a query or when any query references the UDF.

In an embodiment, at 331, the query parser transparent rewrites the query to call the instance.

In an embodiment of 331 and at 332, the query parser replaces a GROUP BY clause that performs aggregation with a PARTITION BY clause that performs an equivalent aggregation within the query.

In an embodiment, at 340, the query parser processes within a parser/optimizer of a database. In an embodiment, the query parser/optimizer is the parser 102.

Figure 4:
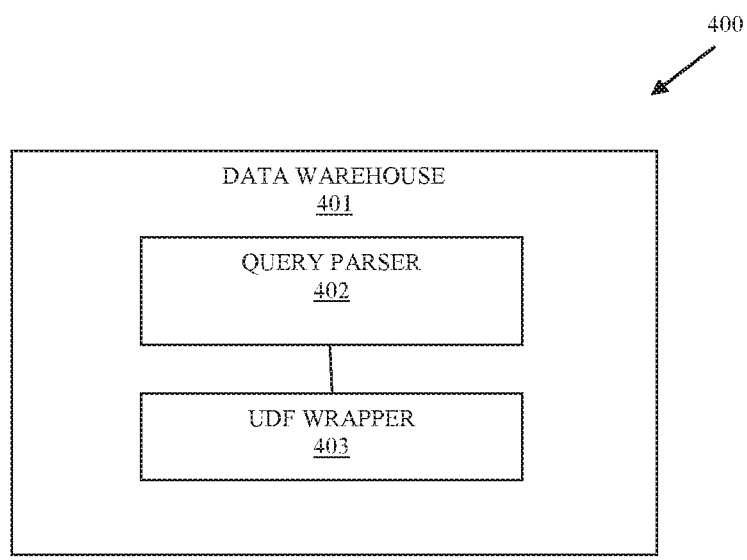
FIG. 4 is a diagram of a system for transparent UDF optimization processing, according to an example embodiment.

FIG. 4 is a diagram of a system 400 for transparent UDF optimization processing, according to an embodiment. The system 400 includes a variety of hardware components and software components. The software components are programmed as executable instructions into memory or a non-transitory computer-readable medium for execution on the hardware components.

The system 400 implements, inter alia, the processing discussed above with the FIGS. 1A-1F and 2-3.

The system 400 includes a data warehouse 401. The data warehouse 401 includes a query parser 402 and a UDF wrapper 403.

In an embodiment, the query parser 402 is all of or some combination of: the parser 102, the method 200, and/or the method 300.

The query parser 402 is configured to: 1) execute on a hardware processor of a network computing device, 2) generate the UDF wrapper 403 as an equivalent instance of a UDF in response to the UDF registered by a user with the data warehouse, and 3) provide instructions that processes the equivalent instance in place of the UDF when the UDF is called within a query In an embodiment, the query parser 402 is further configured to: change a mechanism in which input data is passed to the UDF within the UDF wrapper 403, register the equivalent instance with the data warehouse as a replacement to the UDF, and replace a GROUP BY clause that performs data aggregation when the query is processed with a PARTITION BY clause within the query. The PARTITION BY clause performs an equivalent data aggregation as the data aggregation.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled

The invention claimed is:

1. A method, comprising:
   identifying a source code for a User-Defined Function (UDF) being created by a user in a Data Definition Language (DDL) statement;
   generating a new source code for the UDF;
   creating a wrapper source code representing an instance of the new source code that selectively calls the UDF; and
   processing an executable version of the instance when the UDF is called in a query, further including rewriting the query to call the instance instead of the UDF and replacing a GROUP BY clause in the query with a PARTITION BY clause.

2. The method of claim 1, wherein identifying further includes identifying the UDF as an aggregate data function provided by the user in a CREATE clause of the DDL statement.

3. The method of claim 2, wherein generating further includes generating the new source code as an aggregate table operator.

4. The method of claim 1, wherein creating further includes changing a manner in which input data is passed to the UDF is processed within the wrapper source code.

5. The method of claim 4, wherein changing further includes providing batching instructions within the wrapper source code to batch the input data before the wrapper code calls the UDF.

6. The method of claim 4, wherein changing further includes providing buffering instructions within the wrapper source code for allocating at least one memory buffer for holding the input data before the wrapper code calls the UDF and for holding results produced by the calls to the UDF.

7. The method of claim 1, wherein creating further includes rewriting the DDL statement to replace the UDF with the instance.

8. The method of claim 1 further comprising, dynamically processing the method within a database parser that interprets the query and generates executable query instructions for the query.

9. The method of claim 8, wherein dynamically processing further includes transparently performing the method in a manner that the user is unaware of and where the UDF, the DDL statement, and the query remain unchanged from the perspective of the user.

10. A method, comprising:
    transparently generating a wrapper representing an instance of a User-Defined Function (UDF) in response to the User-Defined Function (UDF) being registered;
    registering the instance as a replacement for the UDF; and
    calling the instance when a query references the UDF, further including transparently rewriting the query to call the instance and replacing a GROUP BY clause that performs aggregation with a PARTITION by clause that performs an equivalent aggregation within the query.

11. The method of claim 10, wherein transparently generating further includes altering how input data is passed to the UDF within the wrapper.

12. The method of claim 11, wherein altering further includes providing a batching mechanism for batching the input data before passing to the UDF within the wrapper.

13. The method of claim 10, wherein registering further includes transparently rewriting a Data Definition Language (DDL) statement that registered the UDF to replace the UDF with the instance.

14. The method of claim 10 further comprising, processing the method within a parser/optimizer of a database.

15. A system, comprising:
    a data warehouse including:
    a query parser; and
    a User-Defined Function (UDF) Wrapper;
    wherein the query parser is configured to i) execute on a hardware processor of a network computing device, ii) generate the UDF wrapper as an equivalent instance of a UDF in response to the UDF registered by a user with the data warehouse, and iii) provide instructions that processes the equivalent instance in place of the UDF when the UDF is called within a query; and
    wherein the query parser is further configured in ii) to change a mechanism in which input data is passed to the UDF within the UDF wrapper, register the equivalent instance with the data warehouse as a replacement to the UDF, and replace a GROUP BY clause that performs data aggregation when the query is processed with a PARTITION BY clause within the query, wherein the PARTITION BY clause performs an equivalent data aggregation as the data aggregation.

\* \* \* \* \*